Figure 1:
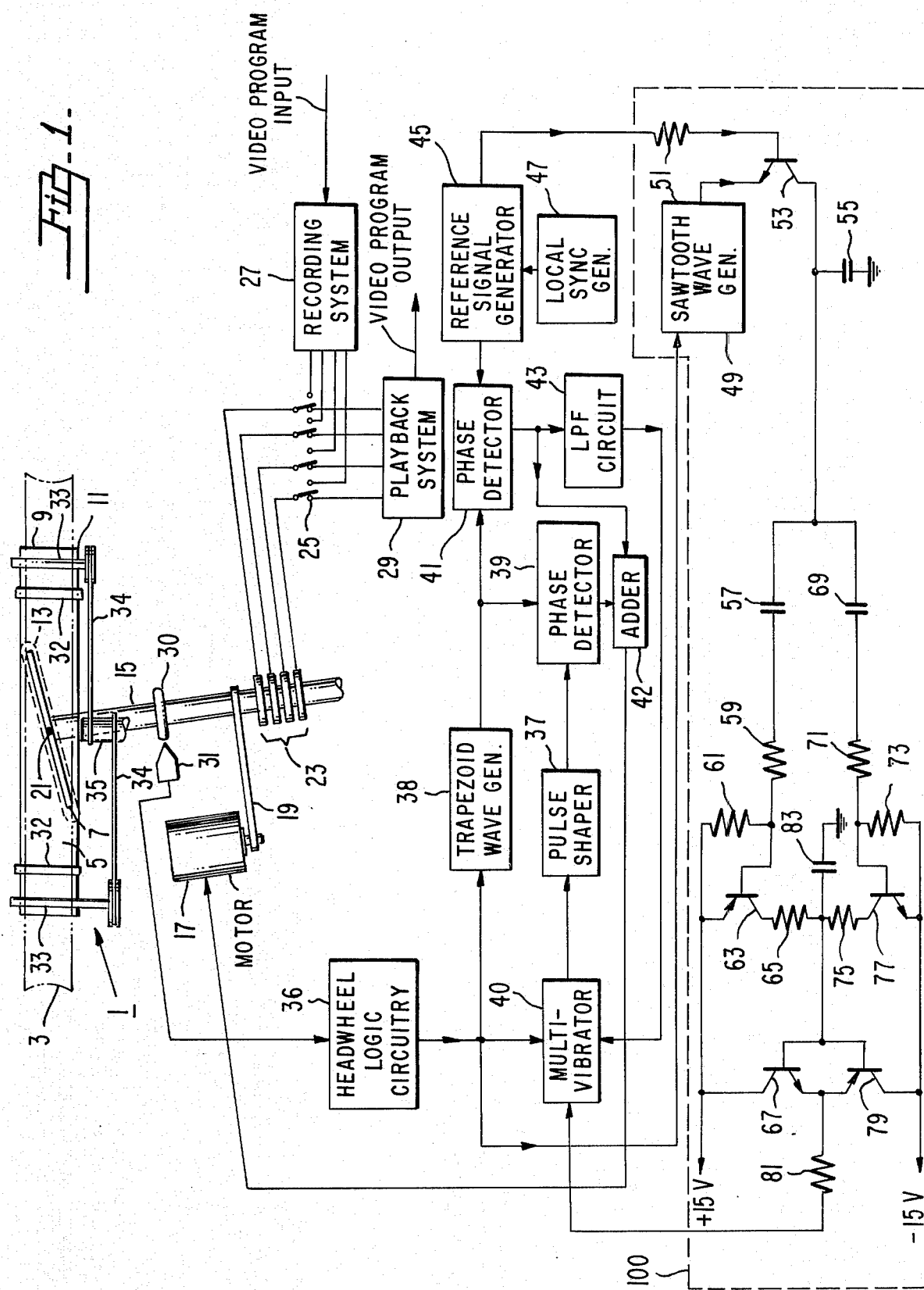

United States Patent [19]

Beck

[11] 4,003,090
[45] Jan. 11, 1977

[54] MAGNETIC RECORDING AND REPRODUCING SYSTEM WITH TAPE-TO-HEAD SPEED CONTROL

[75] Inventor: John Brewer Beck, Indianapolis, Ind.

[73] Assignee: RCA Corporation, New York, N.Y.

[22] Filed: Jan. 29, 1975

[21] Appl. No.: 545,155

[30] Foreign Application Priority Data

| Feb. 18, 1974 | United Kingdom | 7257/74 |
| Feb. 18, 1974 | United Kingdom | 7254/74 |
| Feb. 18, 1974 | United Kingdom | 7256/74 |

[52] U.S. Cl. ................................ 360/70; 360/73; 360/85
[51] Int. Cl.² ................ H04N 5/78; G11B 15/54; G11B 27/10
[58] Field of Search ............ 360/70, 73, 85; 178/6.6 P; 318/301, 302, 306, 309, 310, 314

[56] References Cited

UNITED STATES PATENTS

| 3,097,267 | 7/1963 | Clark et al. | 360/70 |
| 3,174,090 | 3/1965 | Hall | 318/314 |
| 3,187,092 | 6/1965 | Shashoua et al. | 360/70 |
| 3,270,130 | 8/1966 | Hurst et al. | 360/70 |
| 3,478,178 | 11/1969 | Grace | 360/70 |
| 3,705,840 | 12/1972 | Kosugi | 360/70 |

Primary Examiner—Raymond F. Cardillo, Jr.
Attorney, Agent, or Firm—Eugene M. Whitacre; Mason DeCamillis

[57] ABSTRACT

Apparatus is provided for controlling the phase and speed of a motor for driving the rotary magnetic heads of a video tape recorder. An output of a signal generator, for example, a sawtooth wave, having a frequency corresponding to the rotational speed of the motor is compared with an external reference signal, for example, a 60 Hertz power line signal. A difference in frequency generates a varying error voltage whose polarity is indicative of the error direction. Relatively large or prolonged frequency errors result in an error voltage waveform having an abrupt and relatively large change. This error voltage is differentiated to create relatively large pulses of polarity depending on the direction of the error voltage. The relatively large pulses either charge or discharge a capacitor, the output of which changes the current to the motor so as to reduce the relatively large frequency error to a range suitable for handling by a conventional combined position and velocity servo system.

7 Claims, 11 Drawing Figures

MAGNETIC RECORDING AND REPRODUCING SYSTEM WITH TAPE-TO-HEAD SPEED CONTROL

This invention relates to a motor servo system, and more particularly is directed to a servo system for a motor which drives rotating magnetic heads in a video tape recorder.

This invention further relates to a magnetic recording and reproducing system of the type in which signals are recorded by means of rotating magnetic heads on a magnetic tape in tracks extending obliquely to the lengthwise direction of the tape and, more particularly, to a video tape recording and reproducing system of the foregoing type as described in U.S. patent application Ser. No. 372,002, filed on June 2, 1973, in the name of Henry Ray Warren and assigned to RCA Corporation.

Speed control has continually presented problems in recording systems and particularly in systems for the recording and reproduction of television signals. Slight speed variations produce phase shifts in the recorded and reproduced television signals which causes severe distortion of the reproduced picture. In color television recording and reproduction, the minute phase variations in the television signal due to deviation from constant speed in the recording and reproducing process distorts the color information, since the color information depends upon the phase characteristics of the recorded and reproduced signals.

Prior systems, in order to provide speed control which is so highly sensitive and accurate as to be suitable for television recording and reproducing apparatus, employed control systems highly sensitive to both speed variations and position errors in the moving head system. Representative of such prior systems is that which is described in U.S. Pat. No. 3,174,090, entitled *PHASE RESPONSIVE MOTOR SPEED CONTROL SYSTEM*, patented Mar. 16, 1965, and assigned to RCA Corporation. In such a television recording and reproducing apparatus which scans transverse tracks on a magnetic tape record, a wheel carrying a plurality of magnetic heads is rotated about an axis substantially parallel to the direction of movement of the tape. A transducer, such as a tone wheel, associated with the rotating headwheel, provides repetitive signals at a rate determined by the speed of rotation of the wheel.

Such systems generally include means to provide an error signal when the rate of the control signals varies from a rate corresponding to the desired constant speed of rotation of the headwheel. Furthermore, a reference frequency is generated corresponding to this constant speed. Phase comparison means are provided to compare the control signals and the reference signals and to provide additional error signals indicative of phase variations therebetween. The phase error signals and the rate error signals are combined and applied to control the speed of the headwheel. In addition, phase error signals are coupled to the means which detects rate variations in the control signals and operates to control the sensitivity of the rate detection means. By the combination of these detection means, the headwheel may be locked into rotation at the desired constant speed.

In the arrangement disclosed in the above-referenced U.S. patent application Ser. No. 372,002, the video record medium is scanned without removing it from an associated protective cartridge. Here, a four transducer scanner is arranged to extend into the cartridge and scan the video record medium. The scanner, which includes a slotted guide surface in which the transducers are swept, is shaped for interposition between the walls of the cartridge to establish an interface with the medium within the boundaries of the cartridge. The tape recording format selected for this process amounts to a given transducing head recording one complete field of information of the tape. It necessarily follows that the circumferential distance between transducing heads situated on the transducer headwheel must equal the length of an oblique track of information of the magnetic tape. In order to minimize the tape to slotted guide surface contact within the cartridge, the number of transducing heads mounted on the headwheel was selected equal to four, thereby requiring the magnetic tape to make contact with only slightly more than one-quarter of the perimeter of the slotted guide surface.

With the adoption of this recording format, a headwheel with four transducer heads mounted upon it must necessarily have a larger radius than a headwheel with two or three transducer heads. Such a transducer headwheel of relatively large size and mass places additional requirements on the headwheel servo system. That is, the amount of correction in the frequency of the transducer headwheel that a particular headwheel servo system can make is determined by the bandwidth of the particular servo system. The phase shift between DC motor voltage and the headwheel velocity when a relatively massive headwheel is being utilized, limits this bandwidth to a relatively small value. With the massive headwheel used in the aforementioned four transducer machine, a position-velocity servo system of the type described in the above-referenced patent provides a pull-in range of approximately ±3%. This represents a narrow tolerance band for the changes which take place in the system. The invention described herein will enable an increase in this pull-in range to ±15% of the nominal headwheel velocity.

In accordance with the present invention, an output of a signal generator, for example, a sawtooth wave, having a frequency corresponding to the rotational speed of the headwheel motor is compared with an external reference signal, for example, a 60 Hertz, power line signal. A difference in frequency generates a varying error voltage whose polarity is indicative of the error direction. Relatively large or prolonged frequency errors result in an error voltage waveform having an abrupt and relatively large change. This error voltage is differentiated to create relatively large pulses of polarity depending on the direction of the error voltage. The relatively large pulses either charge or discharge a capacitor, the output of which changes the current to the headwheel motor so as to reduce the relatively large frequency error to a range suitable for handling by a conventional combined position and velocity servo system.

Figure 2:
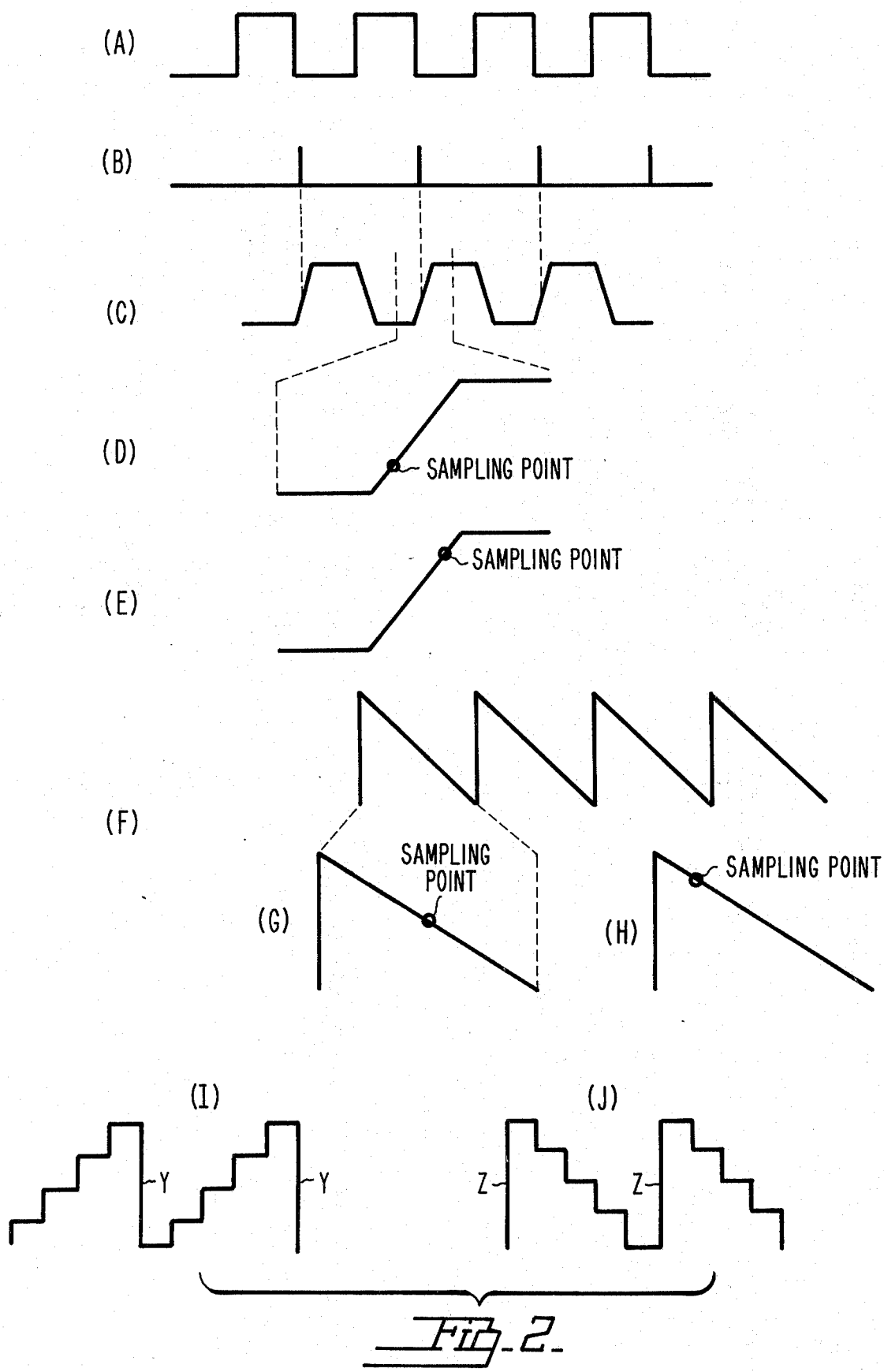

Further features of this invention will become apparent from a consideration of the accompanying specification and drawing of which:

FIG. 1 is a diagrammatic representation of one embodiment of a control system in accordance with the present invention; and FIG. 2, consisting of 2A through 2J, is a series of waveforms of signals in the system and circuit illustrated in FIG. 1.

Referring to FIG. 1, the illustrated magnetic video tape recorder includes a transport scanner assembly 1 for transducing information from a weblike record medium 3 such as a tape disposed within a cartridge assembly (not shown). The transport scanner assembly 1 includes an arcuate guide surface 5 having a narrow slot 7 therethrough which extends along and diagonally across the surface 5 between edges 9 and 11 thereof.

A substantially planar disc or headwheel 13 having a shaft 15 is rotatably mounted for rotation of the disc 13 through the slot 7. Shaft 15 of the disc or headwheel 13 is driven by a motor 17 through a belt 19. Mounted about the periphery of the headwheel 13 at approximately equally spaced intervals (90°) are four transducers 21. Where the recording web is a magnetic tape, the transducers 21 may be one of the known types of magnetic head transducers. The transducers 21 are arranged on the periphery of the headwheel 13 to protrude a small distance beyond the surface 5 in the slot 7. Signal information may be fed to the rotating transducers 21 from a recording system 27 and derived from the rotating transducers 21 for providing inputs to a playback system 29 by any one of a number of techniques. One such arrangement utilizes slip rings 23 on the rotatable shaft 15 which cooperates with sliding contacts on a stationary member, not shown. The recording system includes an FM modulator. The television signal on an FM carrier is amplified and used to drive all four magnetic heads through the slip rings 23. During playback, the magnetic heads are connected through the slip rings and suitable switching arrangement 25 to a playback system 29. This playback system includes amplifiers, response equalizers, a switching system and an FM demodulator for reconstituting the video signal.

Respective ones of a pair of recording web driving members or capstans 33 are disposed at each end of the arcuate web guide surface 5. The capstans 33 are rotatably mounted in suitable support members, not shown, and are driven from the shaft 35 of a second motor, not shown, by suitable belt means 34. A pair of guide members 32 are floatably mounted to the tape cartridge, not shown, for permitting angular movement of said members. When the cartridge assembly is disposed in cooperative relation with the transport scanner assembly 1, these guide members 32 dispose the web material 3 in the desired angular orientation with respect to the arcuate guide surface 5. The construction of the transport scanner assembly 1, the means for driving supply and takeup reels (not shown), and the means by which the transport scanner assembly engages the tape cartridge for in-cartridge scanning do not form a part of the present invention and are therefore not described herein. A more detailed description of the aforementioned may be found in the above-mentioned application of Henry Ray Warren, Ser. No. 372,002.

In the illustrated system, the pickup transducer 31 is disposed at a fixed position. Accordingly, a tone wheel pulse will be produced for each cycle of rotation of each head, thereby producing four pulses for each revolution of the headwheel 13 (e.g., a 60 Hertz rate). As the tone wheel pulse is produced at a certain time during each cycle of rotation of a head, such pulses may be used to indicate errors in the position of the heads with respect to the magnetic tape by phase comparison of a reference signal with control signals derived from the tone wheel pulses.

Furthermore, the illustrated control system includes a velocity error detector system which is responsive to such control signals. To this end, the output of pickup transducer 31 (the nominal 60 Hertz pulse waveform) is applied to headwheel logic circuitry 36. Logic circuitry 36 typically includes two cascaded binary counters which are reset to zero for each revolution of the headwheel. The output from a first such binary counter stage is in the form of a 30 Hertz square wave (waveform A of FIG. 2), the transitions of which are timed with respect to the passage of the transducer heads over the tape.

The 30 Hertz square wave is applied to a trapezoid wave generator 38 and also triggers a one-shot multivibrator 40. Multivibrator 40 generates a pulse signal which is in predetermined time relationship with respect to one edge (e.g., the positive-going edge) of the 30 Hertz square waves. The output of multivibrator 40 is supplied to a pulse shaper and amplifier 37 which includes differentiating and clipping circuits arranged to provide pulses (waveform B) of relatively short duration which occur, for example, slightly more than half a cycle of waveform A later than the reference edge noted above.

The trapezoid generator 38 produces signals (waveform C) which, under synchronized operating conditions, include a rising portion, the first half of which occurs substantially centered around the output of pulse shaper 37. The trapezoidal waveform (C) and the reference pulses (B) are supplied to a first phase detector circuit 39. The output from phase detector 39 is an error signal which may be relatively positive or negative, in accordance with the sense of the phase or time difference between the applied signals and will have a magnitude related to the magnitude of this phase difference. This error signal is representative of velocity errors of the headwheel 13.

When the sampling pulse (waveform B) occurs at the reference position relative to the trapezoid wave, (see expanded time scale waveform D), which will be the case when the headwheel velocity is correct, a reference output voltage which produces substantially zero speed correction is coupled from the phase detector 39 to the motor 17. If, however, the reference slope of the trapezoid occurs too early, as would be the case if the headwheel 13 is running too fast, the trapezoid wave will be sampled at the upper end of the slope to provide a positive error signal. Similarly, if the headwheel 13 is running slow, the reference pulse will appear to slide down the trapezoid, thereby producing a relatively negative error signal to motor 17.

Position information is obtained by means of another phase detector 41 which is essentially the same as phase detector 39. The trapezoid waves from generator 38 along with reference signals obtained from a reference signal generator 45 are supplied to detector 41. Generator 45 may, for example, when in a "playback" mode, receive local power line at 60 Hertz and provide suitable shaping and division of this input signal to provide an output signal of 30 pulses per second. This reference signal also may be derived from a local synchronizing signal generator 47 when operating in the "record" mode. The 30 Hertz reference signal from generator 45 samples the trapezoid wave in a manner somewhat similar to the velocity error detection system involving phase detector 39.

Output error signals from position phase detector 41 and velocity phase detector 39 are combined to provide a DC control voltage for headwheel drive motor 17 to maintain a desired speed and position control.

In addition, with respect to the position control system, a low-pass filter circuit 43 is connected between phase detector 41 and the one-shot multivibrator 40 in FIG. 1. This low-pass filter may be a resistance-capacitance network designed to transmit correction signals representative of long-term drifts of the reference frequency or of the operating characteristics of multivibrator 40. The delay in the multivibrator 40 is changed, either lengthened or shortened, to compensate for such drifts.

The circuitry provided in the dashed block 100 provides a further error correction and is particularly designed to correct relatively large headwheel velocity errors. To this end, the control signals from headwheel logic circuitry 36 (waveform A) are applied to a sawtooth wave generator 49 which provides an output waveform represented by waveform F in FIG. 2 (i.e., a nominally 30 Hertz sawtooth). The sawtooth waveform is applied to one input of a sample and hold circuit comprising a transistor 53 and capacitor 55. A second input to the sample and hold circuit is provided by reference signal generator 45 (also a 30 Hertz waveform similar to that described above).

Transistor 53 functions as a bidirectional sampling switch. Transistor 53 compares the outputs from sawtooth wave generator 49 and reference signal generator 45 received at its emitter and base electrodes, respectively, to compare the relative phase therebetween, as shown in expanded time scale waveform G of FIG. 2. If the sampling pulse occurs at the midpoint of the sawtooth wave, which will be the case when the repetition rate of the control pulse signals from the headwheel 13 is uniform, a substantially constant output voltage is produced at the collector electrode of transistor 53. If, however, a reference pulse occurs early, as would be the case if the headwheel 13 is running slow, the sawtooth wave will be sampled nearer the upper end of the sloping edge to provide a positive error signal (see waveform H). Capacitor 55 stores this output error voltage. This error voltage is then differentiated in each of the circuits comprising capacitors 57, 69 and resistors 59, 61 and 73, 71.

When the headwheel 13 is rotating too slowly, an increasingly positive error voltage is generated at the collector of transistor 53 (see waveform I). The error voltage increase in stair-step fashion represents a situation where the headwheel velocity is continuing to be slow causing the sampling wave to appear to move up the sawtooth ramp. These incremental voltage steps continue until the sampling reference voltage coincides with or passes the steep portion of the sawtooth waveform. At this point, there is a large drop in the voltage across capacitor 55 which is represented by the large voltage drop labeled "Y" in waveform I.

Resistors 59, 61 and capacitor 57 differentiate the error voltage held by capacitor 55. The resistors 61 and 59 further function as a voltage divider with a ratio of approximately 10 to 1 (e.g., resistor $61 = 3.3k$, resistor $59 = 33k$). Such an arrangement renders transistor 63 (and similarly arranged transistor 77) insensitive to the relatively small voltage pulses produced by differentiation of the small stair-step error voltages. When, however, the relatively large negative voltage change Y occurs, the resulting relatively large negative voltage spike applied to the base of transistor 63 will exceed the conduction threshold voltage, thereby driving transistor 63 into conduction. Conduction by transistor 63 will charge capacitor 83 through resistor 65. The resulting voltage across capacitor 83 is then applied to a push-pull amplifier configuration of transistors 67 and 79. Transistor 67 then couples a positive DC error voltage to the one-shot multivibrator 40 through resistor 81.

The operating cycle of multivibrator 40 will then be speeded up (i.e., the generated reference pulse will occur sooner compared to the reference edge of waveform A). The velocity error correction system described earlier will then operate to cause the trapezoid to track with the multivibrator 40 output. This result will be accomplished by the velocity phase detector 39 producing an appropriate correction voltage to cause motor 17 to increase its speed.

In similar fashion when the headwheel 13 is rotating too rapidly, a declining staircase error voltage is generated at the collector of transistor 53 (waveform J). As the headwheel velocity continues to be high, the sampling reference signal continues to move down the ramp of the sawtooth wave until such time as the sampling reference signal coincides with or passes the rapidly increasing portion of the sawtooth. At that time, a large increase in error voltage, shown as Z in waveform J, takes place. Resistors 71, 73 and capacitor 69 provide the differentiation function as explained above. When the large voltage increase Z takes place, the threshold conduction level of transistor 77 will be exceeded, causing it to conduct and charge capacitor 83 through resistor 75 negatively. This negative voltage change will be applied to push-pull network 67, 79 where PNP transistor 79 will couple a negative error voltage through resistor 81 to the one-shot multivibrator 40. The multivibrator 40 will "slow down" causing the velocity correction system to operate to also cause motor 17 to slow down.

It is therefore seen that the DC error signal output from circuit 100 is applied to the velocity-position servo control system to enable this system to bring the headwheel velocity into the lock-in range of the headwheel servo system by providing sufficient additional error voltage to correct for large headwheel velocity errors outside the bandwidth of the conventional system. Once the headwheel servo system is brought back into its normal lock-in range, the changes in error voltage across capacitor 55 will be relatively small or non-existent. The remainder of circuit 100 is no longer part of the overall velocity error correction system.

It will be apparent that other modifications and variations of the described embodiment may be effected without departing from the scope or spirit of this invention as defined in the appended claims.

What is claimed is:

1. In a magnetic recording and reproducing system in which magnetic recording and reproducing head means are mounted on a wheel driven by rotational driving means for recording and reproducing signals on a transported magnetic tape in successive tracks that are skewed relative to the lengthwise direction of the tape, a control system comprising:

means for producing a substantially square wave having a period determined by the rate of rotation of said wheel for providing a repetitive control signal during each cycle of rotation of said wheel at a rate corresponding to said rate of rotation of said wheel;

monostable multivibrator means for generating a pulse signal in a predetermined time relationship with respect to one edge of said square wave for supplying first controllable reference signals having a repetition rate representative of a desired velocity of said wheel;

a first control means responsive to said control signal and said first reference signals for providing a first velocity error signal;

means for providing second reference signals having a substantially fixed repetition rate;

a second control means responsive to said control signal and to said second reference signals for providing a second error signal indicative of relatively slowly varying deviations in the position of said head means from a predetermined positional relation with respect to said tape;

a third control means responsive to said control signal and to said second reference signals for providing a third error signal in response to errors in velocity of said wheel greater than a predetermined threshold;

means coupling said third error signal to said monostable multivibrator means for varying said predetermined time relationship; and means for coupling said first, second and third error signals to said driving means so as to maintain synchronization of said head means with said tracks.

2. In a magnetic recording and reproducing system in which magnetic recording and reproducing head means are mounted on a wheel driven by rotational driving means for recording and reproducing signals on a transported magnetic tape in successive tracks that are skewed relative to the lengthwise direction of the tape, a control system comprising:

means for providing a repetitive control signal during each cycle of rotation of said wheel at a rate corresponding to the rate of rotation of said wheel;

means for supplying first controllable reference signals having a repetition rate representative of a desired velocity of said wheel;

a first control means responsive to said control signal and said first reference signals for providing a first velocity error signal;

means for providing second reference signals having a substantially fixed repetition rate;

a second control means responsive to said control signal and to said second reference signals for providing a second error signal indicative of relatively slowly varying deviations in the position of said head means from a predetermined positional relation with respect to said tape;

a third control means comprising a sawtooth wave generator responsive to said control signal to provide a sawtooth wave having a relatively slowly sloping portion and a relatively rapidly sloping portion and signal comparison means responsive to said sawtooth wave and said second reference signals for comparing the relative phase therebetween, said third control means providing a third error signal in response to errors in velocity of said wheel greater than a predetermined threshold; and means for coupling said first, second and third error signals to said driving means so as to maintain synchronization of said head means with said tracks.

3. A control system according to claim 2 in which said third control means further comprises first storage means for holding incremental stair-step voltage variations representative of said relative phase.

4. A control system according to claim 3 in which said third control means further comprises differentiating means coupled to said first storage means for producing relatively large output pulses in response to relatively large increases or decreases in voltage across said first storage means, said third control means further comprising means responsive to said large output pulses coupled to said means for supplying first controllable reference signals for varying the rate thereof.

5. A control system according to claim 4 in which said means for supplying a control signal includes apparatus for producing a substantially square wave having a period determined by said rate of rotation of said wheel and said means for supplying first controllable reference signals comprises a monostable multivibrator for generating a pulse signal in a predetermined time relationship with respect to one edge of said square wave.

6. A control system according to claim 5 wherein said monostable multivibrator is coupled to said third control means and is responsive to said third error signal for varying said predetermined time relationship.

7. A control system according to claim 6 in which said means responsive to said large output pulses in said third control means further comprises a voltage threshold circuit, second voltage storage means and a switching circuit coupled between said threshold circuit and said second storage means for providing a relatively positive or negative DC error voltage to said monostable multivibrator whereby the operating cycle of said multivibrator is speeded up or slowed down, thereby causing said driving means to correct the rotational velocity of said wheel so as to rotate said wheel in synchronization with said tracks.

* * * * *